R. M. CLARK.
SPRING WHEEL.
APPLICATION FILED AUG. 29, 1913. RENEWED JULY 16, 1915.
1,172,870.   Patented Feb. 22, 1916.
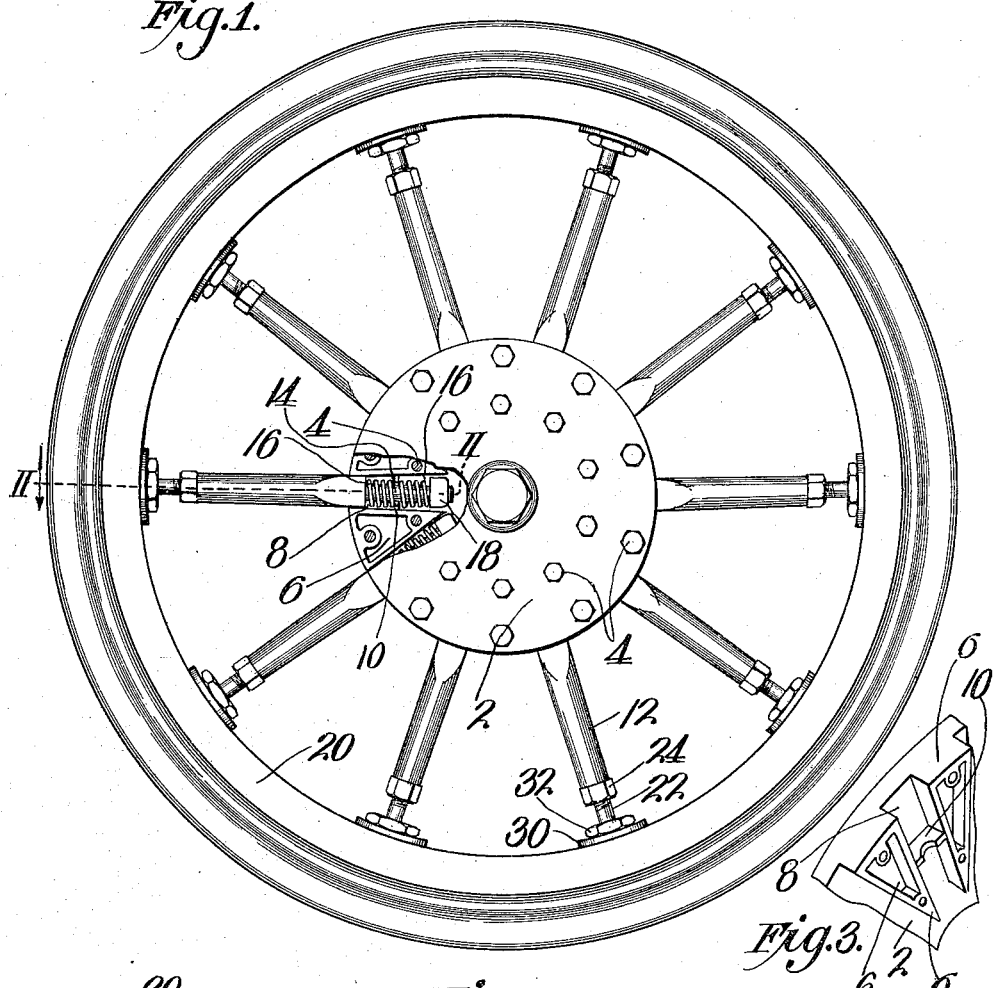
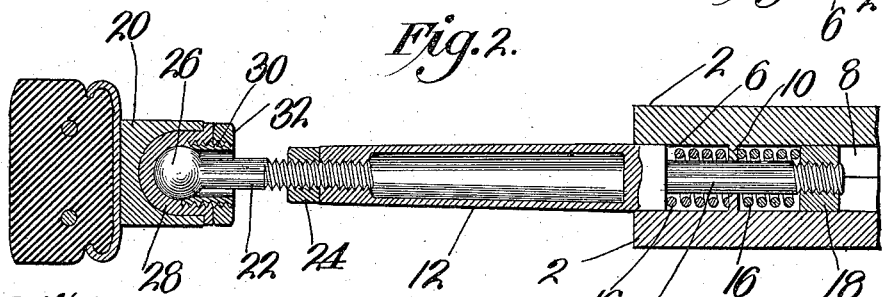

UNITED STATES PATENT OFFICE.

ROSWELL M. CLARK, OF KANSAS CITY, MISSOURI.

SPRING-WHEEL.

1,172,870. Specification of Letters Patent. Patented Feb. 22, 1916.

Application filed August 29, 1913, Serial No. 787,352. Renewed July 16, 1915. Serial No. 40,161.

*To all whom it may concern:*

Be it known that I, ROSWELL M. CLARK, a citizen of the United States, residing at Kansas City, in the county of Jackson and State of Missouri, have invented certain new and useful Improvements in Spring-Wheels, of which the following is a specification.

This invention relates to spring wheels and my object is principally to devise a wheel of this character in which provision is made for absorbing as far as practicable all shocks and vibrations particularly those due to rebounding of the wheel after it has responded to an unevenness in the roadbed.

To this end the invention comprises an improved form of connection between the spoke and hub of the wheel in which is employed a duplex spring construction whereby the spoke and hub are held slidingly connected together for cushioned relative movements. Furthermore the springs are held under an initial tension so that there is no lost motion and there is an immediate cushioning action brought into play for every relative movement of the rim and hub of the wheel, whether this be a movement of the parts away from or into normal position.

It is a further object to provide a greatly simplified spring wheel construction which will present a pleasing appearance and have none of the spring devices exposed to view.

With these objects in view the invention consists in certain novel and peculiar features of construction and organization as hereinafter described and pointed out in the appended claims, and in order that it may be fully understood reference is to be had to the accompanying drawing, in which—

Figure 1, is a side elevation, partly broken away, of a spring wheel embodying my invention. Fig. 2, is a section along the line II—II of Fig. 1. Fig. 3, is a perspective detail of a portion of one of the hub members.

Referring to the drawing, the hub member of the wheel comprises a pair of circular plates 2 forming a housing for the inner ends of the spokes, said plates being suitably secured together as by bolts 4. The inner faces of the plates 2 are formed with radial inwardly tapering projections 6, so proportioned and arranged as to divide the space between the plates into radial guiding passages 8 for the inner ends of the spokes. These passages gradually widen toward the center of the wheel so that the spokes are permitted a slight tilting movement in the plane of the wheel. Moreover all of the passages communicate with the space about the center of the hub thus allowing the adjacent spokes to come into contact at their inner ends when the wheel is subjected to extreme pressure, as in my copending application No. 732,455, filed Nov. 30, 1912.

Within each of the passages 8 is a fixed split collar 10 formed one half on each plate 2 between each pair of adjacent projections 6 so that when the plates are assembled each collar will encircle the inner end of one of the spokes. Each spoke comprises a cylindrical member 12 fitting loosely the outer portion of one of the passages 8 and having a reduced inner end 14 fitting loosely the collar 10 of said passage. Mounted on its reduced portion is a pair of coiled springs 16 one of which is positioned between the collar 10 and the shoulder formed on the spoke at the mouth of the passage 8, while the other spring is positioned on the other side of said collar and held upon the spoke by a nut 18.

Prior to the assembling of the parts, the nuts 18 are tightened to subject the springs to a suitable tension in proportion to the weight of the machine and the load to be carried so that the hub will remain approximately concentric of the rim under ordinary conditions. With such an arrangement it will be clear that the hub and spokes are yieldingly held against movement either toward or away from each other, and there can be no such movement until the action of one of the springs of each of the spokes, excepting those extending at right angles to the line of pressure, has first been overcome. The proportion of the springs is such and their tension so gaged as to take care of all of the relative movement of the hub and spokes without ever completely relaxing any of the springs or allowing any lost motion during a rebound of the wheel. Thus there is always a series of springs presenting a yielding opposition to the relative movement of the hub and spokes in any direction and at the same time there is a like number of springs ready at any phase of such movement to yieldingly oppose a reversal thereof, and since the tension of the latter springs is never fully relaxed the reaction to the rebound comes into play instantly and without any chance of vibration being set up in the parts, which was one objection to my previous construction. It will be further noted that where two or more spokes are moved together into the central space within the hub, as when extreme pressure is brought to bear upon the wheel, such spokes engage, which, on account of the spokes engaging the outer ends of the passages 8, immediately locks the spokes against further movement, whereupon further action upon the wheel through said spokes must take place by the movement of the hub against the combined action of the springs on the spokes at the opposite side of the hub. This affords an effective yielding action for all excessive strains placed upon the wheel and one which responds instantly as soon as the strains upon two or more of the spokes have passed a given point.

The spokes are joined to the rim 20 by connections substantially identical with those shown in my application above referred to and comprising a screw 22 adjustably engaging the outer end of the spoke and locked by a jam nut 24, said screw having a ball head 26 received in a socket piece 28 carried by the rim, the ball head being retained within the socket piece by means of a tubular screw 30 and jam nut 32.

From the above it will be apparent that I have produced a spring wheel embodying the features of advantages enumerated as desirable and I wish it to be understood that while I have illustrated and described one form which my invention is adapted to take, I reserve the right to make all changes falling within the scope of the appended claims.

I claim—

1. In a spring wheel, a tire member, a series of spokes pivotally connected at their outer ends to said tire member, a hub member provided with a series of radial passages for slidingly receiving the inner ends of said spokes, said passages widening inward and communicating with each other at their inner ends and slidingly fitting the spokes at their outer ends, the inner ends of adjacent spokes being adapted to engage and limit each other against further inward movement, and means for yieldingly opposing the sliding movement of each spoke in either direction of its length.

2. In a spring wheel, a tire member, a series of spokes connected at their outer ends to said tire member, a hub member provided with a series of radial passages for slidingly receiving the inner ends of said spokes, the inner end of each spoke being provided with a reduced portion and a pair of coil springs carried by said reduced portion, a nut for securing said springs upon the spoke, and a fixed abutment within each passage for engaging the adjacent ends of the corresponding pair of springs.

In testimony whereof, I affix my signature, in the presence of two witnesses.

ROSWELL M. CLARK.

Witnesses:
CHAS. W. GERARD,
G. Y. THORPE.

Copies of this patent may be obtained for five cents each, by addressing the "Commissioner of Patents, Washington, D. C."